Sept. 17, 1929.  C. W. WRIGHT  1,728,584
DEVICE FOR TEACHING ARITHMETIC
Filed March 15, 1926
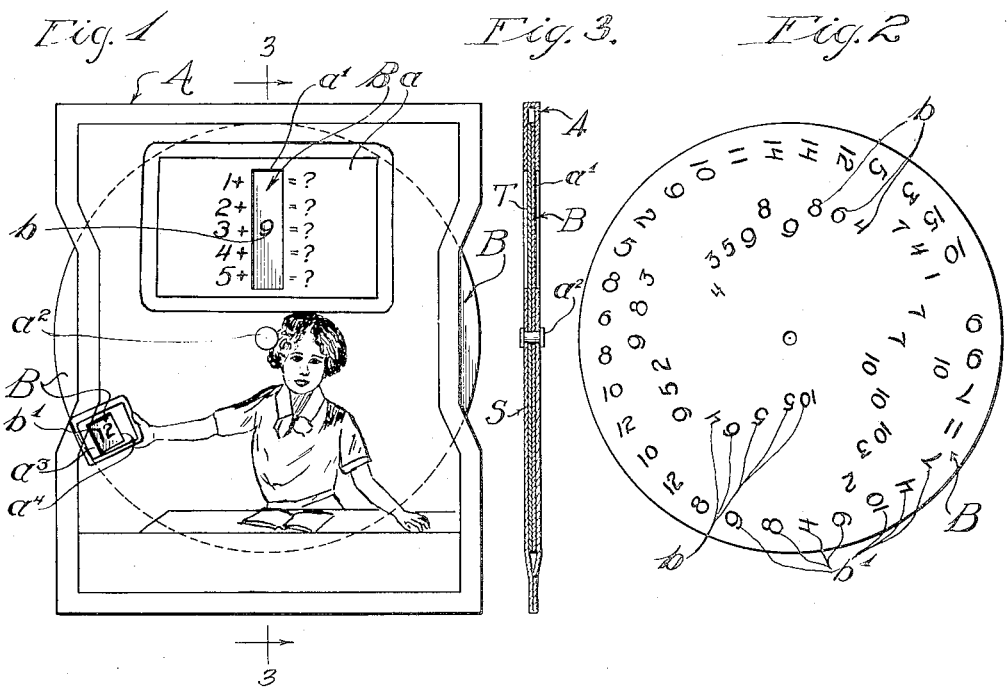
Inventor:
Carl W. Wright
By Walter A. Knight
Attorney Patented Sept. 17, 1929

1,728,584

UNITED STATES PATENT OFFICE

CARR W. WRIGHT, OF CINCINNATI, OHIO

DEVICE FOR TEACHING ARITHMETIC

Application filed March 15, 1926. Serial No. 94,791.

My invention relates to giving instruction in mathematics in a simple and attractive manner.

Many children find it very difficult to acquire abstract knowledge. For instance in the simple exercises in arithmetic there is generally nothing attractive to a child,—nothing to cause that concentration on the problem that is required. Mere figures do not interest most young children, but when associated in attractive form with other interesting things the child learns quickly.

One object of my invention is to associate mathematical problems with some interesting appropriate pictorial matter, so that the pupils' minds will be alert and eager as when they are playing. In fact, my invention enables children to play with each other, and thus instruct each other, the device itself unerringly giving the correct answer for each problem displayed by it.

Another object of my invention is to afford attractive self instruction with the usual danger of error incident to self instruction, eliminated.

Another object of my invention is to provide a cheap, durable device that occupies little space, and one the parts of which will not become separated and lost.

The aim of modern educators is to interest the young pupil and therefore, get his or her whole hearted cooperation spontaneously. My invention is fully in accord with this aim.

The particular embodiment of my invention, selected for illustration provides means for displaying two sets of arithmetical problems and answers on each device, one on each side.

Figure 1 is a front elevation of my invention adapted to teach addition,

Fig. 2, a detail, is the corresponding elevation of the numeral card for Fig. 1, Fig. 3, is a cross section on the line 3—3 of Fig. 1.

Referring now to the drawings, Fig. 1, shows the front of a double faced device with the card A having a picture on it representing a teacher standing in front of a black board $a$ with a window $a^1$ cut in said card, thru which window appear one at a time, the numbers $b$ on the front side of the card B.

At the left of the window $a^1$ is a column of numbers, with a plus sign after each and opposite each such number and plus sign on the right side of said window is an equals mark and a question mark.

The figures $b$ are arranged in concentric circles on the card B, with their bases toward its center and so arranged that when the card B is placed in position behind the card A and rotated in relation thereto on the pivot $a^2$, that appropriate numbers will appear in the window $a^1$ between each of the numbers at the left of the plus marks and the opposite equals mark.

Toward the lower left corner of the card A and preferably remote from the right edge of the black-board $a$, is the picture of a slate $a^3$ held in the teacher's right hand, and a window $a^4$ is cut through the card A through which window appear numbers $b^1$ one at a time, each being the sum constituting the correct answer of the problem presented by the number then shown thru the window $a^1$ and the number at its left and in the same horizontal line. These answer numbers $b^1$ are all arranged on the outer circle of numbers on the same side of the card B. While the device may be made single, that is of the A and B sheets only, pivoted together, I prefer to make it double, that is with another set of problems on the other face.

The character of problems presented may be the same, or of some other mathematical sort. For instance, Figs. 1 and 2 show all the cards needed to illustrate addition problems; and the number of problems presented will depend upon the size of the device or the size of the figures used thereon, the length of the window $a^1$ and the number of appropriate numbers on the card B, being the answers to the problems presented by the numbers in and contiguous to said window.

In Fig. 3 is shown the back member of the same device being a card S having a picture on it representing a group of children playing school out of doors with a blackboard $s$ on an easel leaning against a fence, with a window $s^1$ cut in said card, thru which appear one at a time, the numbers $t$ on the front side of the card T.

At the right of the window $s^1$ is a column of subtrahend numbers with a minus sign in front of each and an equals sign and question mark after it.

The figures $t$ are arranged in concentric circles on the card T, with their bases toward its center and so arranged that when the card T is placed in position behind the card S and rotated in relation thereto on the pivot $a^2$, that appropriate minuend numbers will appear in the window $s^1$ at the left of each minus sign, number, equals sign and question mark.

Toward the lower left corner of the card S and preferably remote from the right edge of the blackboard $s$, is a window $s^4$ cut in the card S, in which window appears the picture, the appropriate number $t^1$ representing the difference between the minuend in the window $s^1$ and the subtrahend on the same line at the right of said window, as tho a child was holding in its hand a sheet of paper with the answer thereon.

The cards A and S are preferably fastened together at the top and bottom as shown in Fig. 5, the periphery of the disc cards B and T protruding from one or both sides, and the cards B and T are glued or otherwise secured together, or the figures $b$ and $b^1$ may be printed on one side and figures $t$ and $t^1$ on the other side of the same card.

In Fig. 6 is shown the front member of another similar device, being a card M having a picture of a home scene on it representing a chart $m$ with a window $m^1$ cut therein, thru which window appears one at a time, the numbers $n$ on the front side of the card disc N. In the picture the mother is shown directing the attention of one child to the chart, while at a distance stands another child with a window $m^4$ placed so as to make it appear that the matter appearing behind this window is held in the child's hand.

At the left of the window $m^1$ is a column of numbers, multiplicands, with a multiplication sign after each, and an equals sign on the right of the window in line with each of said numbers.

As each multiplier $n$ appears in the window $m^1$, the product number $n^1$ appears in the window $m^4$. The change of relative position of the cards M and N is effected by rotating the card N on the pivot $m^2$ by pressing with the finger on the protruding part $n^2$ of the disc N.

Fig. 8 shows the back member of the device of which M is the front, and consists of a card D, pierced at the center like the others for the pivot $m^2$, and has a picture on it representing an educated horse and its trainer. A window $d^1$ is cut thru that portion of the card D which represents a hanging chart $d$ and thru this window may be seen dividend numbers $e$ on the card E exposed one at a time. To the right of this window are a column of signs meaning divided by and after each a number a divisor succeeded by an equals sign and a question mark.

Next to the horse's nose is a window $d^4$, placed so as to make it appear that the matter appearing behind this window is held in the horse's mouth; and in this window appears the number $e^1$ on the card E which is the quotient of the particular dividend and its divisor shown in the chart above. The arrangement of the numbers $e$ and $e^1$ on the card E is similar to that of the numbers $b$ and $b^1$ on B, $t$ and $t^1$ on T, and $n$ and $n^1$ on N, so that the desired problems are shown in and contiguous to the windows $a^1$, $s^1$, $m^1$ and $d^1$, and the correct answers to those problems are shown in the windows $a^4$, $s^4$, $m^4$ and $d^4$ respectively. The answer windows may be covered as with the thumb while holding out the device presenting the problem and uncovered for comparison after the child has stated the answer.

By association of problem and picture in this way it is possible to vary the sequence of problems as they occur in the arithmetic tables and thus independent mental impressions are made which are not interdependent, and which are inculcated on the child mind by constant repetition in play.

It will be apparent that a great variety of interesting pictures may be devised for the combined entertainment and mathematical instruction of children; and that many changes may be made in the form of the device here shown without departing from the spirit of my invention. I conceive, therefore, as within the scope of my invention all forms readable on the claims.

I claim as my invention and desire to secure by Letters Patent of the United States:

1. A device for showing complete any one of a plurality of partially stated arithmetical problems and at another place the correct answer to the complete problem shown; said device comprising a card constituting the face of the device, a window in said face card, numbers and arithmetical signs forming parts of a plurality of problems arranged in juxtaposition to said window, another window in said face card in which answers to each of the said problems appear, another card behind the first and rotatable in relation thereto, numbers on said second card adapted to be seen one at a time through said problem window so as to complete one at a time, each said problem, and other numbers on said second card adapted to be seen one at a time through said answer window, said numbers so arranged on said card that the correct answer will appear for each complete problem as it is shown.

2. A means of teaching arithmetic to small children comprising a device for showing complete any one of a plurality of partially stated arithmetical problems and at another place the correct answer to the complete problem shown; said device consisting of the combination of a card constituting the face of the device, a window in said face card, numbers and arithmetical signs forming parts of a plurality of problems arranged in juxtaposition to said window, another window in said face card in which answers to each of the said problems appear, another card behind the first and rotatable in relation thereto, numbers on said second card adapted to be seen one at a time through said problem window so as to complete one at a time, each said problem, and other numbers on said second card adapted to be seen one at a time through said answer window, said numbers so arranged on said card that the correct answer will appear for each complete problem as it is shown, and a picture on said face card suggesting action helping to solve the problem stated.

In testimony whereof I have hereunto set my hand.

CARR W. WRIGHT.